United States Patent Office 3,749,705
Patented July 31, 1973

3,749,705
1,6-AMINOSUBERIC ACID ANALOGUE OF 7-GLYCINE-OXYTOCIN
Shumpei Sakakibara, Osaka, and Tsutomu Yamanaka, Fukuoka, Japan, assignors to Yoshitomi Pharmaceutical Industries, Ltd., Osaka, Japan
No Drawing. Filed Nov. 17, 1970, Ser. No. 90,480
Claims priority, application Japan, Nov. 17, 1969, 44/92,327
Int. Cl. C07c 103/52; C07g 7/00; C08h 1/00
U.S. Cl. 260—112.5                            1 Claim

ABSTRACT OF THE DISCLOSURE

A cyclic polypeptide of the formula:

⌐Tyr-Ile-Gln-Asn-Asu-Gly-Leu-Gly-NH₂ wherein Tyr, Ile, Gln, Asn, Asu, Gly and Leu are residues of L-tyrosine, L-isoleucine, L-glutamine, L-asparagine, L-α-aminosuberic acid, glycine and L-leucine, respectively, and process for preparing same. The cyclic polypeptide is useful as a lactagogue and stimulant of uterine contraction.

BACKGROUND OF THE INVENTION

This invention relates to a novel and therapeutically valuable cyclic polypeptide.

SUMMARY OF THE INVENTION

The novel cyclic polypeptide of this invention is a compound having the following Formula I:

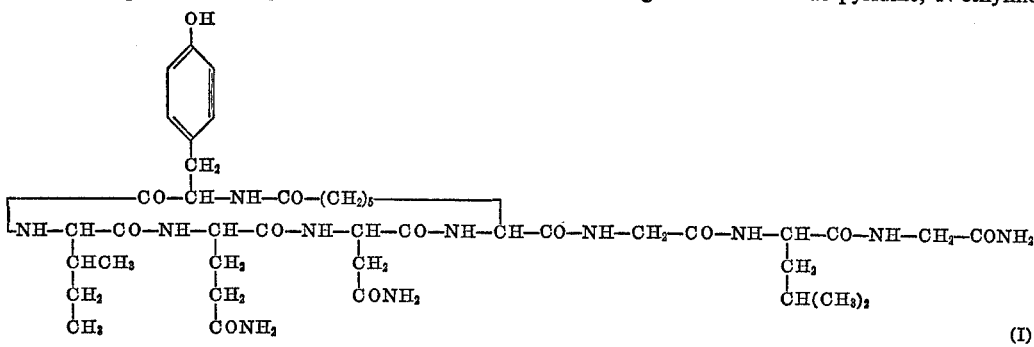

(I)

For simplicity, the following Formula I' is used in place of Formula I in the following disclosure:

⌐Tyr-Ile-Gln-Asu-Gly-Leu-Gly-NH₂            (I')

wherein Tyr, Ile, Gln, Asn, Asu, Gly and Leu are the residues of L-tyrosine, L-isoleucine, L-glutamine, L-asparagine, L-α-aminosuberic acid, glycine and L-leucine, respectively.

Said α-aminosuberic acid is represented by the following formula:

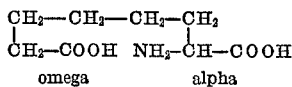

CH₂—COOH   NH₂—CH—COOH
omega            alpha

Formula I' shows that the omega-carboxyl group of the α-aminosuberic acid forms the amide linkage with the amino group of the tyrosine.

The cyclic polypeptide of Formula I exhibits excellent lactating uterine contractive actions. Because of this oxytocin-like activity, the polypeptide of the present invention is useful as a lactagogue and stimulant of uterine contraction.

Oxytocin, having an —S—S— linkage, is easily deteriorated by polymerization or oxidation during preservation, whereas the cyclic polypeptide I of the present invention lacks an —S—S— linkage. Hence, it is very stable during preservation, and can be preserved for long periods of time in the form of a solution of high concentration or a powder prepared by lyophilization.

Some pharmacological activities of Compound I are shown below:

|  | Uterine contracting activity, U/mg. | Milk-ejecting activity, U/mg. |
|---|---|---|
| Compound I | 248.8 | 441.2 |
| Oxytocin | 450 | 450 |

The cyclic polypeptide of Formula I can be produced by subjecting a compound of the formula:

H-Tyr-(R¹)-Ile-Gln-Asn-Asu(OR)-
$\quad\quad\quad\quad\quad\quad\quad\quad$ Gly-Leu-Gly-NH₂ (II)

wherein $R^1$ represents hydrogen or a hydroxy-protective group for the tyrosine, and R is a reactive group, to cyclization.

This cyclization reaction gives a cyclic polypeptide of the formula:

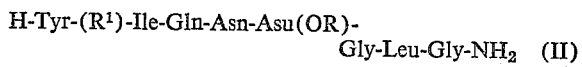
⌐Tyr(R¹)-Ile-Gln-Asn-Asu-Gly-Leu-Gly-NH₂

The protective group $R^1$ is then eliminated by a conventional method.

In Formula II, the protective group $R^1$ of the tyrosine is preferably benzyl or tertiary butyl, and the reactive group R is, for example, 2,4,5-trichlorophenyl or pentachlorophenyl.

The cyclization is carried out in the presence of an organic base such as pyridine, N-ethylmorpholine or triethylamine, and optionally, in the presence of a solvent such as dimethylformamide, at about room temperature or at a slightly elevated temperature.

Elimination of the OH-protective group $R^1$ of the tyrosine can be carried out by a conventional method. For example, the elimination of $R^1$=benzyl is carried out by catalytic reduction in a solvent such as dioxane, dioxane-water or dimethylformamide, preferably in the presence of a palladium catalyst. The elimination of $R^1$=tertiary butyl is carried out by the treatment with hydrogen chloride, hydrogen bromide or trifluoroacetic acid.

DETAILED DESCRIPTION OF INVENTION

The intermediate of Formula II can be produced, for example, by the following route:

In the following disclosure, the symbols are as follows:
Z: benzyloxycarbonyl
AOC: tertiary-amyloxycarbonyl
Et: ethyl
Bu$^t$: tertiary-butyl
NP: p-nitrophenyl
Su: succinimido

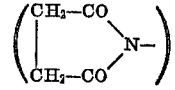

Bzl: benzyl
TCP: 2,4,5-trichlorophenyl (1) Reacting H-Gly-Leu-Gly-NH₂ with a reactive ester (e.g. NP ester) at the α-carboxyl group of α-aminosuberic acid (the amino group and the omega-carboxyl group of which are protected, for example, with Z and Buᵗ respectively), to give Z-Asu(OBuᵗ)-Gly-Leu-Gly-NH₂, for example.

(2) Elimination of the amino-protective group of the compound obtained in (1) followed by reaction with a reactive ester (e.g. NP ester) of the asparagine (the amino group of which is protected) to give Z-Asn-Asu(OBuᵗ)-Gly-Leu-Gly-NH₂, for example.

(3) Elimination of the amino-protective group of the compound obtained in (2) followed by reaction with a reactive ester (e.g. NP ester) of the glutamine (the amino group of which is protected) to give Z-Gln-Asn-Asu(OBuᵗ)-Gly-Leu-Gly-NH₂, for example.

(4) Elimination of the amino-protective group of the compound obtained in (3) followed by reaction with a reactive ester (e.g., Su ester) of the isoleucine (the amino group of which is protected) to give Z-Ile-Gln-Asn-Asu(OBuᵗ)-Gly-Leu-Gly-NH₂, for example.

(5) Elimination of the omega-carboxyl-protective group of the Asu by treatment with trifluoroacetic acid to give Z-Ile-Gln-Asn-Asu(OH)-Gly-Leu-Gly-NH₂, for example.

(6) Elimination of the amino-protective group of the compound obtained in (5) followed by reaction with a reactive ester (e.g., Su ester) of the tyrosine (the amino group and the hydroxyl group of which are protected, for example, with Z and Bzl respectively), to give Z-Tyr(Bzl)-Ile-Gln-Asn-Asu(OH)-Gly-Leu-Gly-NH₂, for example.

(7) Treatment of the compound obtained in (6) e.g. with trichlorophenyl trifluoroacetate, to give a reactive ester at the omega-carboxyl group of the Asu, such as, Z-Tyr(Bzl)-Ile-Gln-Asn-Asu(OTCP)-Gly-Leu-Gly-NH₂.

(8) Elimination of the amino-protective group of the compound obtained in (7). In some cases, the OH protective group of the tyrosine is eliminated simultaneously.

The reactions and treatment in the preparation of these intermediates can be carried out in a conventional manner.

Hence, the esterification to give a reactive ester is carried out by treating a compound having a free carboxyl group, e.g., with p-nitrophenol, 2,4,5-trichlorophenol, pentachlorophenol or succinimido trifluoroacetate in a solvent such as pyridine, pyridine-dimethylformamide or dimethylformamide-triethylamine at about room temperature or at a slightly elevated temperature.

The removal of amino-protective groups such as benzyloxycarbonyl (Z) or the like, by catalytic reduction using a palladium catalyst in a solvent such as ethanol, dioxane, dioxane-water or dimethylformamide. When the protective group is tertiary-amyloxycarbonyl or the like, removal may be perfected by treatment with trifluoroacetic acid, etc.

The peptide linkage formation is carried out in the presence of a solvent such as dimethylformamide, pyridine, triethylamine or N-ethylmorpholine at about room temperature or at a slightly elevated temperature.

Elimination of the omega-carboxyl-protective group of α-aminosuberic acid (Step (5)) is advantageously carried out, for example, by treatment of trifluoroacetic acid. This elimination may be carried out after Step (3), but preferably after Step (4).

Treatment with trifluoroacetic acid to eliminate the amino-protective group (AOC, for example) of the compound obtained in (7) brings about the simultaneous elimination of the OH-protective group of the tryrosine when it is Buᵗ, but not when it is Bzl. The Bzl group may be eliminated by catalytic reduction after cyclization. On the other hand, in case the amino-protective group of the compound obtained in (8) is Z, the elimination of Z may directly be followed by the cyclization.

The overall reaction may be conducted at room temperature or a temperature slightly higher than room temperature, under atmospheric pressure for a period ranging fom several hours to several days.

The procedures of (1) to (8) are further illustrated by the following scheme:

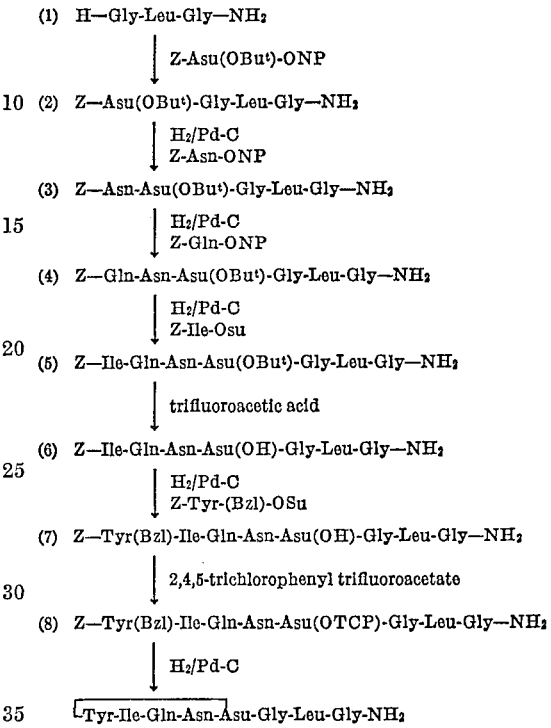

The present invention will be further understood from the following examples, which are merely illustrative and not limitative of the present invention.

EXAMPLE

Z-Gly-Leu-Gly-OEt (I)

15.0 g. of Z-Gly-Leu-Gly-OEt in ethanol (120 ml.) plus acetic acid (15 ml.) is subjected to catalytic reduction using 2.2 g. of a 5% palladium charcoal catalyst. After checking the completion of the reaction by thin-layer chromatography the catalyst is filtered off, the solvent is distilled off under reduced pressure, the residue is dissolved in dimethylformamide (DMF, 65 ml.), and Z-Gly-ONP (18 g.) is added. Then, the resulting mixture is allowed to stand at room temperature (15° C.) for 2 days. Water is added, and the reaction mixture is extracted with ethyl acetate. The extract layer is washed with 0.5 N aqueous ammonia until the yellowish coloring disappears, washed with water and dried over sodium sulfate. The solvent is distilled off under reduced pressure and the residue is recrystallized from a mixture of petroleum benzene and methylene chloride to give 10.5 g. (60.2%) of the title Compound (I) which has a M.P. (melting point) of 106–108.5° C., and $[\alpha]_D^{16}$ −27.0° (c. 2.87, ethyl acetate).

Elementary analysis: Found (percent): C, 58.94; H, 7.29; N, 10.08. Calculated for $C_{20}H_{29}O_6N_3$ (percent): C, 58.95; H, 7.17; N, 10.31.

Z-Gly-Leu-Gly-NH₂ (II)

A solution of Compound I (26 g.) in methanol (340 ml.) saturated with ammonia gas in a sealed bottle is allowed to stand for 3 days. The methanol and ammonia are distilled off under reduced pressure, the residue is dried several times by flushing with benzene and dissolved in methanol (120 ml.), the insoluble matter being filtered off. Finally, the solvent is distilled off under reduced pressure. The residue is recrystallized from a mixture of petroleum benzene (115 ml.) and ethanol (38 ml.) to give 19.6 g. (81.3%) of the title Compound II which has a M.P. of 123–125° C. and $[\alpha]_D^{16}$ −15.2° (c. 1.1, DMF).

Elementary analysis: Found (percent): C, 56.49; H, 7.11; N, 14.69. Calculated for $C_{18}H_{26}O_5N_4 \cdot \frac{1}{4}H_2O$ (percent): C, 56.46; H, 6.98; N, 14.63.

Z-Asu(OBu$^t$)-Gly-Leu-Gly-NH$_2$ (III)

Compound II (22.8 g.) in ethanol (200 ml.) is subjected to catalytic reduction using a 5% palladium charcoal catalyst. After the reaction, the catalyst is filtered off and the filtrate is concentrated under reduced pressure. The residue is dried several times by flushing with benzene, and recrystallized from a mixture of ethanol and benzene to give 15.0 g. of H-Gly-Leu-Gly-NH$_2$ melting at 87–90° C.

H-Gly-Leu-Gly-NH$_2$ (5.4 g.) is allowed to react in DMF (12 ml.) at 27° C., overnight with Z-Asu(OBu$^t$)-ONP prepared from 9.5 g. of the dicyclohexylamine salt of Z-Asu(OBu$^t$)OH by reaction with p-nitrophenyl trifluoroacetate in pyridine. The reaction mixture is poured into water and extracted with ethyl acetate. The extract layer is first washed with 1 N aqueous ammonia until the yellowish coloring disappears and then with 0.6 N hydrochloric acid. It is then washed with water, and dried over sodium sulfate. The ethyl acetate is distilled off under reduced pressure, and the residue is recrystallized from a mixture of ethyl acetate and ethanol to give 9.1 g. (88%) of the title Compound III which has a M.P. of 144–146° C., and $[\alpha]_D^{22}$ −10.8° (c. 0.975, DMF).

Elementary analysis: Found (percent): C, 59.01; H, 8.13; N, 11.11. Calculated for $C_{30}H_{47}O_8N_5 \cdot \frac{1}{4}H_2O$ (percent): C, 59.04; H, 7.85; N, 11.48.

Z-Asn-Asu(OBu$^t$)-Gly-Leu-Gly-NH$_2$ (IV)

Compound III (9.3 g.) in ethanol (100 ml.) is subjected to catalytic reduction using 1.0 g. of a 5% palladium charcoal catalyst. After the reaction, the catalyst is filtered off, and the filtrate is concentrated to give 7.0 g. of a white crystal compound wherein Z is eliminated from III. This compound is then dissolved in DMF (20 ml.) and Z-Asn-ONP (6.3 g.) was added. The resulting mixture was allowed to stand at room temperature (19° C.,) for 2 days. To the reaction mixture is added a large amount of ethyl acetate. The mixture is recrystallized from 90% ethanol to give the title Compound IV. The first crop weighs 9.0 g. and has a M.P. of 223–224.5° C., (decomposition) and the second crop weighs 0.8 g. and has a M.P. of 224–225° C., (decomposition). These crops present a single spot on a thin-layer chromatogram. $[\alpha]_D^{22}$ −13.1° (c. 0.955, DMF).

Elementary analysis: Found (percent): C, 55.59; H, 7.52; N, 13.09. Calculated for $C_{34}H_{53}O_{10}N_7 \cdot H_2O$ (percent): C, 55.34; H, 7.51; N, 13.29.

Z-Gln-Asn-Asu(OBu$^t$)-Gly-Leu-Gly-NH$_2$ (V)

Compound IV (9.8 g.) is suspended in ethanol (320 ml.). A small amount of water is added, and then the suspension is subjected to catalytic reduction using 1.0 g. of a 5% palladium charcoal catalyst. After reaction, the catalyst is filtered off, and the filtrate is concentrated under reduced pressure. The residue is dissolved in DMF (42 ml.). Z-Gln-ONP (5.4 g.) is then added and then the resulting mixture is kept at 33° C., overnight. Z-Gln-ONP (0.2 g.) and DMF (20 ml.) are further supplemented, and then the mixture is kept at 35° C., for several hours. Ethyl acetate is then added to the reaction mixture. The precipitate is triturated, collected by filtration and washed successively with ethyl acetate and acetone. The triturated precipitate is boiled in 90% ethanol (350 ml.) to extract the soluble matter, and the insoluble matter is collected. 9.5 g. of the title compound is obtained which has a M.P. of 244.5–245° C., (decomposition) and $[\alpha]_D^{25}$ −30.7° (c. 0.75, acetic acid). Compound V (0.3 g.) having a M.P. of 243–244° C., (decomposition) can be recovered from the ethanol solution.

Elementary analysis: Found (percent): C, 54.76; H, 7.35; N, 14.92. Calculated for $C_{39}H_{61}O_{12}N_9 \cdot \frac{1}{2}H_2O$ (percent): C, 54.66; H, 7.29; N, 14.71.

Amino acid anlysis:

| Amino acid | Glu | Asp | Asu | Gly | Leu |
| --- | --- | --- | --- | --- | --- |
| Ratio | 1.08 | 1.00 | 0.94 | 2.03 | 1.00 |
| Recovery (percent) | 105 | 97 | 91 | 98 | 97 |

Z-Ile-Gln-Asn-Asu(OBu$^t$)-Gly-Leu-Gly-NH$_2$ (VI)

Compound V (9.8 g.) suspended in a mixture of ethanol (320 ml.), dioxane (200 ml.) and water (30 ml.) is subjected to catalytic reduction using a 5% pallidium charcoal catalyst. After the reaction, the catalyst is filtered off, and the solvent is distilled off under reduced pressure. The residue is dissolved in DMF (40 ml.) Z-Ile-Osu(5.5 g.) is added, and then the resulting mixture is allowed to stand at room temperature (20° C.) for 2 days. To the reaction mixture is added a large amount of ethyl acetate. The precipitate is triturated well, collected by filtration, dissolved in DMF (1 liter) with heating and reprecipitated by the addition of ethyl acetate (800 ml.). After allowing the mixture to stand in an ice-box, the precipitate is collected by filtration, washed with ethyl acetate and dried to give 8.1 g. of the title Compound VI which has a M.P. of 248–249° C. (decomposition) and $[\alpha]_D^{25}$ −39.4° (c. 0.825, acetic acid).

Elementary analysis: Found (percent): C, 55.69; H, 7.72; N, 14.50. Calculated for $C_{45}H_{72}O_{13}N_{10} \cdot \frac{1}{2}H_2O$ (percent): C, 55.71; H, 7.58; N, 14.44.

Z-Ile-Gln-Asn-Asu(OH)-Gly-Leu-Gly-NH$_2$ (VII)

A solution of Compound VI (7.9 g.) in trifluoroacetic acid (80 ml.) is allowed to stand at room temperature (23° C.) for 105 minutes with shaking at intervals. An excess amount of trifluoroacetic acid is distilled off at room temperature under reduced pressure, and ether is added to the oily residue. The solution solidifies instantly when stirred. The solid is triturated, collected by filtration, washed with ether and dried in a desiccator to give 7.55 g. of the title Compound VII which has a M.P. of 239–240° C. (decomposition) and $[\alpha]_D^{23}$ −33.3° (c. 1.02, acetic acid).

Elementary analysis: Found (percent): C, 52.57; H, 7.22; N, 14.88. Calculated for $C_{41}H_{64}O_{13}N_{10} \cdot 2H_2O$ (percent): C, 52.33; H, 7.28; N, 14.89.

Z-Tyr(Bzl)-Ile-Gln-Asn-Asu(OH)-Gly-Leu-Gly-NH$_2$ (VIII)

Compound VII (7.45 g.) suspended in a mixture of ethanol (250 ml.), water (250 ml.), dioxane (220 ml.) and acetic acid (100 ml.) is subjected to catalytic reduction using 2.0 g. of a 5% palladium charcoal catalyst. After the reaction, the catalyst is filtered off, the filtrate is concentrated under reduced pressure, and to the residue are added successively, benzene and water to remove the acetic acid. The residue is dissolved in a mixture of DMF (50 ml.) and dimethyl sulfoxide (DMSO, 250 ml.) with heating. Subsequently, after cooling with water, Z-Tyr(Bzl)OSu (7.0 g.) and N-ethylmorpholine (3.0 ml.) are added, and the resulting mixture is stirred at room temperature (25° C.) for 2 days. Ethyl acetate (1.5 liters) is added to the reaction mixture, and the precipitate, a gelatine-like substance, is collected by filtration and washed with ethyl acetate. The substance is boiled in 80% ethanol (400 ml.), and the insoluble matter is collected by filtration and dried to give 7.05 g. of the title Compound VIII which has a M.P. of 251–252° C. (decomposition) and $[\alpha]_D^{25}$ −15.2° (c. 0.625, DMSO).

A small amount of the gelatine-like substance is precipitated when the 80% ethanol solution is cooled. The substance is collected by filtration, washed successively with 80% ethanol and absolute ethanol, and dried to give 0.95 g. of Compound VIII melting at 250.5–251° C. (decomposition).

Elementary analysis: Found (percent): C, 58.67; H, 6.97; N, 13.15. Calculated for $C_{57}H_{79}O_{15}N_{11}\cdot\frac{1}{2}H_2O$ (percent): C, 58.65; H, 6.91; N, 13.20.

Amino acid analysis:

| Amino acid | Tyr | Ile | Glu | Asp | Asu | Gly | Leu |
|---|---|---|---|---|---|---|---|
| Ratio | 0.90 | 1.10 | 1.00 | 0.98 | 1.03 | 1.90 | 0.98 |
| Recovery (percent) | 90 | 110 | 100 | 98 | 103 | 95 | 98 |

Z-Tyr(Bzl)-Ile-Gln-Asn-Asu(OTCP)-Gly-Leu-Gly-NH$_2$ (IX)

Compound VIII (4.3 g.) is ground into a powder, which is then suspended in a mixture of DMF (80 ml.) and pyridine (29 ml.). To the suspension is added 2,4,5-trichlorophenyl-trifluoroacetate (10.7 g.), and the resulting mixture is stirred at 50° C., for about 7 hours. A large amount of ether is added to the reaction mixture, and the precipitate is collected by filtration, washed with ether and dried in a desiccator to give 4.64 g. of the title Compound IX which has a M.P. of 253–254° C. (decomposition) and $[\alpha]_D^{25}$ —21.4° (c. 0.42, DMSO).

Elementary analysis: Found (percent): C, 56.20; H, 6.37; N, 11.63; Cl, 8.37. Calculated for $$C_{63}H_{80}O_{15}N_{11}Cl_3\cdot\frac{1}{2}H_2O$$

(percent): C, 56.18; H, 6.06; N, 11.44; Cl, 7.90.

⌐Try-Ile-Gln-Asn-Asu-Gly-Leu-Gly—NH$_2$ (X)

To a suspension of Compound IX (1310 mg.) in DMF (350 ml.) is added a suitable amount of palladium black. Hydrogen gas is introduced with stirring at room temperature (25° C.) for about 40 hours. After stirring the mixture at 30–35° C., for several hours, the catalyst is filtered off, and the filtrate is concentrated under reduced pressure. A large amount of ether is added to the residue, and the white coagulum is collected by filtration, washed with ether and dried. This is dissolved in water (30 ml.), and the solution is filtered. The filtrate is passed through a column (3 x 11.5 cm.) of Amberlite IR-45 (OH⁻ form).[1] The fractions which show a UV-absorption maximum at 280 mμ are combined and passed through a column (3 x 12.5 cm.) of CM-Sephadex C-25[2] to remove the non-cyclic compound and obtain neutral parts. The detection of the objective compound is made by UV-absorption at 280 mμ. The aqueous solution of the neutral parts is concentrated below 35° C., under reduced pressure, and the concentrate is lyophilized to give 504 mg. of the crude title Compound X in the form of 5 hydrate.

The crude product (109 mg.) is dissolved in 0.1 N acetic acid (1.3 ml.), and the solution is placed in Sephadex G-25 Column[3] (1.5 x 140 cm.) and eluted with 0.1 N acetic acid. The eluate fractions, each weighing 5 g. and, when judged by UV-absorption, containing the objective product X are combined and lyophilized to give 98 mg. of the product X.

Elementary analysis: Found (percent): C, 51.22; H, 7.31; N, 15.31. Calculated for $C_{42}H_{65}O_{12}N_{11}\cdot 4H_2O$ (percent): C, 51.05; H, 7.45; N, 15.60

Amino acid analysis: The sample (2.7 mg.) is hydrolized in 6 N chloric acid (15 ml.) containing a small amount of phenol at 105° C., for 48 hours.

| Amino acid | Tyr | Ile+Asu | Glu | Asp | Gly | Leu |
|---|---|---|---|---|---|---|
| Ratio | 1.00 | 2.00 | 1.02 | 1.00 | 1.98 | 0.96 |
| Theoretical ratio | 1 | 2 | 1 | 1 | 2 | 1 |
| Recovery (percent) | 100 | 100 | 102 | 100 | 99 | 96 |

Optical rotation: $[\alpha]_D^{24}$ —44.6° (c. 0.505, water).

Paper electrophoresis: single spot with ninhydrin (—) and Pauli (+)

Conditions: Toyo filter paper No. 514, pH 4.8, pyridine-acetic acid buffer solution, 1300 v., 60 minutes Paper chromatography:

$R_f$: 0.65 (n-butanol:acetic acid:water=4:1:1 v./v./v.)

$R_f$: 0.76 (n-butanol:acetic acid:pyridine:water=15.3:10:6 v./v./v./v.)

$R_f$: 0.59 (n-butanol:pyridine:water=4:1:1 v./v./v.)

Although the present invention has been adequately described in the foregoing specification and examples included therein, it is readily apparent that various changes and modifications may be made without departing from the scope thereof.

What is claimed is:

1. Cyclic polypeptide having the formula:

```
                    OH
                     |
                   (C6H4)
                     |
                    CH2
                     |
      ┌────CO—CH—NH—CO—(CH2)5────┐
      │                              │
     ─NH—CH—CO—NH—CH—CO—NH—CH—CO—NH—CH—CO—NH—CH2—CO—NH—CH—CO—NH—CH2—CONH2
         │        │        │        │                       │
        CHCH3    CH2      CH2      CH2                     CH2
         │        │        │        │                       │
        CH2      CH2      CONH2    CONH2                   CH(CH3)2
         │        │
        CH3      CONN2
``` wherein the alpha-carbon atoms of all the constituent amino acids of said cyclic polypeptide, with the exception of glycine each exhibit L-configuration.

References Cited

UNITED STATES PATENTS

| | | | |
|---|---|---|---|
| 3,446,789 | 5/1969 | Rudinger et al. | 260—112.5 |
| 3,352,843 | 11/1967 | Boissonnas et al. | 260—112.5 |

OTHER REFERENCES

Jost et al.: Coll. Czech. Chem. Commun. 32, 1229–12 (1967).

Kobayashi et al.: Bull. Chem. Soc. Japan 42, 3491–3495 (1969), effective date: Nov. 23, 1967. See p. 3491 bottom.

Bespalova et al.: J. Gen. Chem. (USSR) 38, 1642–1644 (1968).

Bodanszky et al.: Chem. Commun. 1968, 766–767.

Sakakibara et al.: Bull. Chem. Soc. Japan 41, 2816 (1968).

Hase et al.: Experientia 25, 1239–1240 (1969).

Pliska et al.: Am. J. Physiol. 215, 916–920 (1968).

LEWIS GOTTS, Primary Examiner

R. J. SUYAT, Assistant Examiner

U.S. Cl. X.R.

424—177

---

[1] Ion exchange resin—Rohm & Haas (U.S.A.).
[2,3] Ion exchange resin—Pharmacia (Sweden).